United States Patent [19]

Nishihara et al.

[11] Patent Number: 4,808,659
[45] Date of Patent: Feb. 28, 1989

[54] ADHESIVE COMPOSITION COMPRISING ORGANOMETALLIC POLYMER

[75] Inventors: Yoshio Nishihara; Noriyuki Isobe, both of Ube; Satoshi Kotera, Hirakata, all of Japan

[73] Assignee: UBE Industries, Ltd., Yamaguchi, Japan

[21] Appl. No.: 939,058

[22] Filed: Dec. 8, 1986

[30] Foreign Application Priority Data

Dec. 13, 1985 [JP] Japan .................................. 60-279229
Mar. 31, 1986 [JP] Japan .................................. 61-70890

[51] Int. Cl.$^4$ .......................... C08J 3/02; C08G 77/04
[52] U.S. Cl. .................................... 524/701; 524/706; 524/783; 524/786; 524/787; 524/788; 524/789; 524/791; 525/475; 525/477; 525/478; 525/389; 528/33; 528/35; 528/30

[58] Field of Search ............... 525/474, 475, 477, 478, 525/389; 524/268, 701, 706, 783, 786, 787, 788, 789, 791; 528/35, 33, 30

[56] References Cited

U.S. PATENT DOCUMENTS

| | | | |
|---|---|---|---|
| 4,100,129 | 7/1978 | Beers | 525/475 |
| 4,347,347 | 8/1982 | Yajima et al. | 528/33 |
| 4,359,559 | 11/1982 | Yajima et al. | 525/475 |
| 4,377,677 | 3/1983 | Iwai et al. | 528/35 |
| 4,590,253 | 5/1986 | Hasegawa | 528/33 |

*Primary Examiner*—John C. Bleutge
*Assistant Examiner*—R. Dean Jr.
*Attorney, Agent, or Firm*—Ladas & Parry

[57] ABSTRACT

An adhesive composition comprising (1) a polymetallocarbosilane or a polycarbosilane and (2) a silicone resin. The adhesive composition further comprises an inorganic filler.

10 Claims, No Drawings

ADHESIVE COMPOSITION COMPRISING ORGANOMETALLIC POLYMER

FIELD OF THE INVENTION

This invention relates to a novel adhesive composition containing a polymetallocarbosilane or a polycarbosilane. More specifically, it relates to a novel adhesive composition comprising a polymetallocarbosilane or a polycarbosilane, and a silicone resin.

DESCRIPTION OF THE PRIOR ART

Mechanical bonding by bolts and rivets has previously been used in bonding applications requiring heat resistance or chemical durability. With the recent technological innovation, bonding with adhesives has been practiced in a variety of fields, and various adhesives have been developed and marketed.

Organic polyimide or polybenzimidazole type adhesives have a heat resistant temperature of 200° to 400° C., and at higher temperatures, they have reduced adhesion strength and inferior durability.

On the other hand, many inorganic adhesives containing inorganic compounds as binders have been known.

Portland cement and gypsum are examples of that type of inorganic adhesives which hardens upon the formation of hydrates. The hardened products, however, lose water of crystallization on re-heating, and fail to retain bonding strength. In addition to the insufficient heat resistance, the hardened products have inferior water resistance and acid resistance.

Another type which hardens by evaporation of water includes those containing water-soluble silicates, such as water glass. It has the defect of having low water resistance and developing alkali stains.

Still another type includes low-melting glass and solders which are used for bonding upon melting. Since they do not have adhesiveness at temperatures above the melting point. To obtain high heat resistance, a high-melting glass or solder must be used.

SUMMARY OF THE INVENTION

It is an object of this invention to provide an adhesive composition which permits bonding at relatively low temperatures even in air, and undergoes very little reduction in adhesion strength in a high temperature atmosphere.

Another object of this invention is to provide an adhesive composition having durability and water resistance.

Still another object of this invention is to provide an adhesive composition which can effect bonding between metallic materials, between non-metallic materials and between a metallic material and a non-metallic material to give bonded structures that can withstand practical use in a severe atmosphere.

Broadly stated, the present invention provides an adhesive composition comprising (1) a polymetallocarbosilane or a polycarbosilane and (2) a silicone resin.

DETAILED DESCRIPTION OF THE INVENTION

The polymetallocarbosilane used in this invention is an organometallic polymer having a number average molecular weight of 400 to 50,000 and composed of (A) carbosilane bond units of the formula

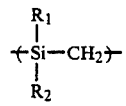

wherein $R_1$ and $R_2$ are identical or different and, independently from each other, represent a lower alkyl group, a phenyl group or a hydrogen atom, and (B) at least one type of metalloxane bond units of the formula

wherein M represents at least one element selected from the group consisting of Ti, Zr, Mo and Cr, and optionally at least a part of each of said elements has at least one lower alkoxy or phenoxy group as a side-chain group, the ratio of the total number of bond units (A) to that of the bond units (B) being in the range of from 1:1 to 10:1, wherein the bond units (A) and (B) are bonded at random in the main-chain skeleton, and/or at least one of the silicon atoms of the bond units (A) is bonded to at least one element M of the bond units (B) via an oxygen atom, whereby the polycarbosilane portion obtained by connecting of the bond units (A) is cross-linked with the bond units (B).

The polycarbosilane used in this invention is an organometallic polymer having a number average molecular weight of 400 to 50,000 and composed mainly of (A) carbosilane bond units of the formula

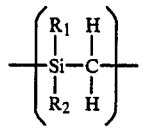

wherein $R_1$ and $R_2$ are identical or different and independently from each other, represent a lower alkyl group, an allyl group, a phenyl group, a silyl group or a hydrogen atom, and (B) silane bond units of the formula

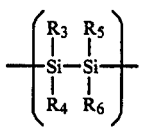

wherein $R_3$, $R_4$, $R_5$ and $R_6$ are identical or different and independently from each other, represent a lower alkyl group, an allyl group, a phenyl group, a silyl group or a hydrogen atom, and (B) silane bond units of the formula, the ratio of the total number of the bond units (A) to that of the bond units (B) being in the range of from 20:1 to 1:20.

The polymetallocarbosilane and polycarbosilane used in this invention are described in U.S. Pat. No. 4,359,559.

It has been found in accordance with this invention that when the adhesive composition of this invention comprising the polymetallocarbosilane or polycarbosilane and a silicone resin is coated on the surfaces of metallic or non-metallic adherends, and the coated surfaces are brought into contact with each other and then heated in an oxidizing or non-oxidizing atmosphere at a temperature of 200° to 2,000° C., a bonded structure having high bond strength and excellent durability can be obtained.

Since the polymetallocarbosilane used in this invention has a heat weight loss of only 10 to 15% by weight when heat-treated at 1000° C. in air for at least 10 hours, the baked film layer undergoes little shrinkage or cracking by weight loss. Accordingly, the resulting adhesive layer hardly changes dimensionally on heating, but remains dense.

Furthermore, since the polymetallocarbosilane contains metal, when it is coated on the surface of a metallic substrate and heated, ultrafine particles of a metalcarbide or a metal oxide form a firm bondate between the adhesive layer and the metallic substrate. Hence, even when the bonded structure is heated to more than 1000° C. in air, the adhesive layer decreases little in adhesion stength. On the surface of ceramics or glass, the aforesaid ultrafine particles function as a binder to provide an adhesive layer firmly bonded to the adherend.

It has been found surprisingly that the adhesive composition composed of the polymetallocarbosilane or polycarbosilane and a silicone resin adheres more firmly to an adherend than an adhesive composed only of the polymetallocarbosilane or polycarbosilane, and gives an adhesive layer having improved heat resistance and excellent flexibility. The adhesive layer composed only of the polymetallocarbosilane or polycarbosilane lacks flexibility and does not show good adhesiveness against peeling force involving bending such as T-peel. Furthermore, polymetallocarbosilane volumetrically shrinks upon heat-treatment at high temperatures although its weight loss on heating is small. The present inventors have extensively made investigations in order to remedy this defect of the polymetallocarbosilane or polycarbosilane and provide a better adhesive composition. As a result, they have found that an adhesive composition having excellent flexibility, film formability and heat resistance can be obtained by using the polymetallocarbosilane or polycarbosilane in combination with a silicone resin.

The silicone resin is added in an amount of 10 to 900 parts by weight, preferably 50 to 200 parts by weight, per 100 parts by weight of the polymetallocarbosilane or polycarbosilane. If the amount of the silicone resin is less than 10 parts by weight, the resulting adhesive layer has reduced flexibility. If it exceeds 900 parts by weight, the excellent heat resistance of the polymetallocarbosilane cannot be exhibited, and the adhesion strength of the adhesive layer after heating at high temperatures is markedly reduced.

The organopolysiloxane used in this invention is at least one material selected, silicone oils, silicon varnishes and silicone rubbers.

An inorganic filler may be added to the adhesive composition in an amount of 10 to 500 parts by weight per 100 parts by weight of the polymetallocarbosilane or the polycarbosilane. The addition of the inorganic filler advantageously increases the flexibility of the adhesive layer at high temperatures. But if it is added too much, it reduces the mechanical strength of the adhesive layer.

The inorganic filler may be any of known inorganic fillers, for example, oxides, carbides and nitrides of boron, magnesium, aluminum, silicon, calcium, titanium, vanadium, chromium, manganese, zinc, zirconium, molybdenum, cadmium, tin, antimony, barium, tungsten, lead and bismuth, and borates, phosphates and silicates of lithium, sodium, potassium, magnesium, calcium and zinc. They may be used either singly or in combination.

A powdery adhesive composition is obtained by mixing and pulverizing the polymetallocarbosilane or polycarbosilane and the silicone resin with or without the inorganic filler. Alternatively, a liquid adhesive composition may be prepared by dissolving or dispersing these materials in a suitable solvent such as benzene, toluene or xylene.

The adhesive composition is applied to one or both surfaces of metallic adherends or non-metallic adherends such as glass, ceramics or refractory bricks which have been cleaned in advance, and the applied surfaces are brought into contact with each other and heated while optionally applying external pressure. The application of the adhesive composition may be effected by uniform scattering when the composition is powdery or by brush, spray, roller or dip coating when the composition is liquid.

The heating temperature is preferably at least 200° C. If, however, the coated surfaces are to be placed in a use environment kept at 200° C. or more, this heating step is not always necessary. If the heating temperature is lower than 200° C., the adhesive layer is dried and cured only insufficiently and a sufficient adhesion strength cannot be obtained.

As a result of this heat-treatment, the adhesive layer is completely cured and adheres firmly to the adherend. The thickness of the adhesive layer after drying and curing is generally 0.1 to 100 microns, most desirably 1 to 10 microns, depending upon the purpose for which the bonded structure is used.

The adhesive composition of this invention can permit bonding at relatively low temperatures with little reduction in strength in a high temperature atmosphere, and effect bonding between metallic materials, between non-metallic materials, and between a metallic material and a non-metallic material in a severe atmosphere. When the adhesive composition of this invention contains a highly insulating metal oxide as the inorganic filler, it has superior thermal insulating property. Thus, by properly selecting the inorganic filler, adhesives having various properties can be provided by this invention.

The following examples illustrate the present invention more specifically. All parts and percentages in these examples are by weight unless otherwise indicated.

REFERENTIAL EXAMPLE 1

Anhydrous xylene (2.5 liters) and 400 g of sodium were put in a 5-liter three-necked flask, and heated to the boiling point of xylene in a stream of nitrogen gas. One liter of dimethyldichlorosilane was added dropwise to the mixture over 1 hour. After the addition, the mixture was heated under reflux for 10 hours to form a precipitate. The precipitate was collected by filtration, and washed first with methanol and then with water to give 420 g of polydimethylsilane as a white powder.

The polydimethylsilane (400 g) was introduced into a 3-liter three-necked flask equipped with a gas introducing tube, a stirrer, a condenser and a distillation tube, and with stirring, heat-treated at 420° C. in a stream of nitrogen (50 ml/min.). As a result, 350 g of a colorless clear, slightly tacky liquid was obtained in the distillation vessel. This liquid had a number average molecular weight, measured by the vapor pressure osmosis method (VPO method), of 470.

The far-infrared absorption spectrum of this substance led to the determination that it was an organosilicon polymer composed mainly of —Si—CH$_2$— bond units and —Si—Si— bond units and containing a hydrogen atom and a methyl group at the side chain of silicon.

REFERENTIAL EXAMPLE 2

The organosilicon polymer obtained in Referential Example 1 (40 g) and 20 g of titanium tetraisopropoxide were weighed, and 400 ml of xylene was added to the mixture to form a homogeneous solution. The solution was reacted under reflux in an atmosphere of nitrogen gas with stirring at 130° C. for 1 hour. After the reaction, the temperature was further raised to distill off the xylene solvent, and the polymerization was carried out at 300° C. for 10 hours to give a crosslinked organometallic polymer containing silicon and titanium. This polymer had a number average molecular weight, measured by the VPO method, of 1,165. Gel permeation chromatography and infrared absorption spectroscopy determined this polymer to be polytitanocarbosilane resulting from partial disappearance of the Si—H bonds in the organosilicon polymer and bonding of the silicon atoms in this portion to the titanium atom of titanium tetraisopropoxide through an oxygen atom, and thereby partly having the —O—Ti(OC$_3$H$_7$)$_3$ group at the side chain of the organosilicon polymer and partly being crosslinked at the organosilicon polymer with the —Ti—O— bond. The reaction conversion and/or the crosslinking rate of this polymer at the Si—H bonded portion was 44.5%. It was confirmed that the ratio of the total number of the —Si—CH$_2$— bond units and —Si—Si— bond units to that of the —O—Ti(OC$_3$H$_7$)$_3$ and —Ti—O— bond units in the organosilicon polymer portion of this polymer was about 6:1.

REFERENTIAL EXAMPLE 3

Referential Example 2 was substantially repeated except that zirconium tetraisopropoxide was used instead of the titanium tetraisopropoxide as one of the starting materials in Referential Example 2.

EXAMPLE 1

One hundred parts of the polytitanocarbosilane obtained in Referential Example 2 and 200 parts of a 50% xylene solution of methylphenylsilicone varnish (TSR-116, a tradename for a product of Toshiba Silicone, Co., Ltd.) were mixed to form a slurry-like composition. The composition was coated to a thickness of about 5 microns on a SUS 304 steel sheet (50×50 mm) which had been sandblasted and then degreased with acetone. Another steel sheet treated in the same way was superimposed on the coated steel sheet and fixed. The assembly was left to stand for 1 hour in an air oven at 200° C. to dry and cure the coated layer.

The bonded structure was then heated in an air oven under the conditions shown in Table 1, and allowed to cool in the oven. The adhesion strength of the bonded structure was evaluated by its tensile shear stress measured at room temperature at a tensile speed of 5 mm/min. The results are shown in Table 1.

TABLE 1

| Heating conditions | Adhesion strength (kg/cm$^2$) |
| --- | --- |
| (A): heated at 200° C. for 1 hour | 40 |
| (B): (A)→350° C. | 100 |
| (C): (A)→500° C. | 100 |

TABLE 1-continued

| Heating conditions | Adhesion strength (kg/cm$^2$) |
| --- | --- |
| (D): (A)→650° C. | 100 |
| (E): (A)→800° C. | 75 |
| (F): (A)→1200° C. | 50 |

In the above table, (B), for example, means that after heating under condition (A) is completed, the heat-treatment was further carried out at a temperature elevation rate of 10° C./min. from 200° C. to 350° C. (C) to (F) have similar meanings.

EXAMPLE 2

Sixty parts of an 80% xylene solution of the polyzirconocarbosilane obtained in Referential Example 3 and 20 parts of dimethylsilicone oil (TSF 431, a tradename for a product of Toshiba Silicone Co., Ltd.) were mixed to form a paste-like adhesive. The adhesive was coated on one surface of each of two commercial silicon carbide plates (density 3.0 g/cm$^3$), and the coated surfaces were laid in contact with each other. The assembly was left to stand in an air oven at 200° C. for 1 hour to dry and cure the coated layers to provide a bonded structure having a tensile shear strength of 200 kg/cm$^2$. The bonded structure was left to stand in an air oven at 800° C. for 1 hour, and allowed to cool in the oven. After cooling, it had a tensile shear strength of 50 kg/cm$^2$. This shows that the paste-like adhesive used had excellent heat resistance.

COMPARATIVE EXAMPLE 1

When an 80% xylene solution of polytitanocarbosilane was dried and cured at 200° C. by the same method as in Example 1, it showed a tensile shear strength of 10 kg/cm$^2$. This low adhesiveness was presumably due to the lack of flexibility of the adhesive layer.

EXAMPLE 3

One hundred parts of the polycarbosilane obtained in Referential Example 1 and 200 parts of a 50% xylene solution of methylphenylsilicone varnish (TSR-116, a tradename for a product of Toshiba Silicone Co., Ltd.) were mixed to form a slurry-like composition. The composition was coated to a thickness of about 5 microns on a SUS 304 steel sheet (50×50 mm) which had been sandblasted and then degreased with acetone. Another steel sheet treated in the same way was superimposed on the coated steel sheet and fixed. The assembly was left to stand for 1 hour in an air oven at 200° C. to dry and cure the coated layer.

The bonded structure was then heated in an air oven under the conditions shown in Table 2, and allowed to cool in the oven. The adhesion strength of the bonded structure was evaluated by its tensile shear stress measured at room temperature at a tensile speed of 5 mm/min. The results are shown in Table 2.

TABLE 2

| Heating conditions | Adhesion strength (kg/cm$^2$) |
| --- | --- |
| (A): heated at 200° C. for 1 hour | 70 |
| (B): (A)→350° C. | 65 |
| (C): (A)→500° C. | 60 |
| (D): (A)→650° C. | 60 |
| (E): (A)→800° C. | 45 |
| (F): (A)→1200° C. | 30 |

In the above table, (B) to (F) have the same meanings as mentioned below Table 1.

EXAMPLE 4

Sixty parts of an 80% xylene solution of the polycarbosilane obtained in Referential Example 1 and 20 parts of dimethylsilicone oil (TSF 431, a tradename for a product of Toshiba Silicone Co., Ltd.) were mixed to form a paste-like adhesive. The adhesive was coated on one surface of each of two commercial silicon carbide plates (density 3.0 g/cm$^3$), and the coated surfaces were laid in contact with each other. The assembly was left to stand in an air oven at 200° C. for 1 hour to dry and cure the coated layers to provide a bonded structure having a tensile shear strength of 200 kg/cm$^2$. The bonded structure was left to stand in an air oven at 800° C. for 1 hour, and allowed to cool in the oven. After cooling, it had a tensile shear strength of 50 kg/cm$^2$. This shows that the paste-like adhesive used had excellent heat resistance.

COMPARATIVE EXAMPLE 2

When an 80% xylene solution of polycarbosilane was dried and cured at 200° C. by the same method as in Example 1, it showed a tensile shear strength of 10 kg/cm$^2$. This low adhesiveness was presumably due to the lack of flexibility of the adhesive layer.

EXAMPLE 5

One hundred parts of the polycarbosilane obtained in Referential Example 1 and 200 parts of a 50% xylene solution of methylphenylsilicone varnish (TSR-116, a trademark for a product of Toshiba Silicone Co., Ltd.) were mixed to form a slurry-like composition. Fifty parts, per 100 parts of the composition, of silicon carbide as an inorganic filler added to form an adhesive composition. The composition was coated to a thickness of about 5 microns on a SUS 304 steel sheet (50×50 mm) which had been sand-blasted and then degreased with acetone. Another steel sheet treated in the same way was superimposed on the coated steel sheet and fixed. The assembly was left to stand for 1 hour in an air oven at 200° C. to dry and cure the coated layer.

The bonded structure was then heated in an air oven under the conditions shown in Table 3, and allowed to cool in the oven. The adhesion strength of the bonded structure was evaluated by its tensile shear stress measured at room temperature at a tensile speed of 5 mm/min. The results are shown in Table 3.

TABLE 3

| Heating conditions | Adhesion strength (kg/cm$^2$) |
| --- | --- |
| (A): heated at 200° C. for 1 hour | 70 |
| (B): (A)→350° C. | 65 |
| (C): (A)→500° C. | 60 |
| (D): (A)→650° C. | 60 |
| (E): (A)→800° C. | 50 |
| (F): (A)→1200° C. | 35 |

In the above table, (B) to (F) have the same meanings as mentioned below Table 1.

EXAMPLE 6

One hundred parts of the polytitanocarbosilane obtained in Referential Example 2 and 200 parts of a 50% xylene solution of methylphenylsilicone varnish (TSR-116, a tradename for a product of Toshiba Silicone Co., Ltd.) were mixed to form a slurry-like composition. The composition was coated to a thickness of about 5 microns on a SUS 304 steel sheet (50×50 mm) which had been sandblasted and then degreased with acetone. Another steel sheet treated in the same way was superimposed on the coated steel sheet and fixed. The assembly was left to stand for 1 hour in an air oven at 200° C. to dry and cure the coated layer.

The bonded structure had a tensile shear strength of 40 kg/cm$^2$. This structure was left to stand in water for 4 weeks, and then its adhesion strength was measured. No reduction in adhesion strength was observed.

What is claimed is:

1. An adhesive composition comprising (1) a polymetallocarbosilane or a polycarbosilane and (2) at least one polyorganosiloxane selected from the group consisting of silicone oils, silicone rubbers and silicone varnishes.

2. The composition of claim 1 wherein the polymetallocarbosilane is an organometallic polymer having a number average molecular weight of 400 to 50,000 and composed of (A) carbosilane bond units of the formula

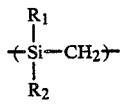

wherein $R_1$ and $R_2$ are identical or different and, independently from each other, represent a lower alkyl group, a phenyl group or a hydrogen atom, and (B) at least one type of metalloxane bond units of the formula

wherein M represents at least one element selected from the group consisting of Ti, Zr, Mo and Cr, and optionally at least a part of each of said elements has at least one lower alkoxy or phenoxy group as a side-chain group, the ratio of the total number of the bond units (A) to that of the bond units (b) being in the range of from 1:1 to 10:1, wherein the bond units (A) and (B) are bonded at random in the main-chain skeleton, and/or at least one of the silicon atoms of the bond units (A) is bonded to at least one element M of the bond units (B) via an oxygen atom, whereby the polycarbosilane portion obtained by connecting of the bond units (A) is crosslinked with the bond units (B).

3. The composition of claim 1 wherein the polycarbosilane is an organometallic polymer having an average molecular weight of 400 to 50,000 and composed mainly of (A) carbosilane bond units of the formula

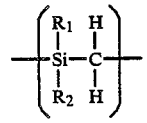

wherein $R_1$ and $R_2$ are identical or different and independently from each other, represent a lower alkyl group, an allyl group, a phenyl group, a silyl group or a hydrogen atom, and (B) silane bond units of the formula

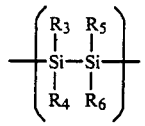

wherein $R_3$, $R_4$, $R_5$ and $R_6$ are identical or different and independently from each other represent a lower alkyl group, and allyl group, a phenyl group, a silyl group or a hydrogen atom, the ratio of the total number of the bond units (A) to that of the bond units (B) being in the range of from 20:1 to 1:20.

4. The composition of claim 1 comprising 100 parts by weight of the polymetallocarbosilane or polycarbosilane and 10 to 900 parts by the polyorganosiloxane.

5. The composition of claim 1 which is in the form of a powder, or a liquid dissolved or dispersed in a solvent.

6. The composition, as in claim 1 wherein component (2) comprises a silicon oil.

7. The composition, as in claim 1 wherein component (2) comprises a silicon varnish.

8. The adhesive composition as in claim 1 wherein component (2) is a silicone oil or silicone rubber.

9. The composition of claim 1 which further comprises an inorganic filler.

10. The composition of claim 9 wherein the inorganic filler is at least one member selected from the group consisting of oxides, carbides and nitrides of boron, magnesium, aluminum, silicon, calcium, titanium, vanadium, chromium, manganese, zinc, zirconium, molybdenum, cadmium, tin, antimony, barium, tungsten, lead and bismuth, and borates, phosphates and silicates of lithium, sodium, potassium, magnesium, calcium and zinc.

* * * * *